Jan. 20, 1942. W. H. TAYLOR 2,270,356
VALVE
Filed Sept. 2, 1937

INVENTOR.
WILLIAM H. TAYLOR
BY
John H. Leonard,
HIS ATTORNEY.

Patented Jan. 20, 1942

2,270,356

UNITED STATES PATENT OFFICE 2,270,356

VALVE

William H. Taylor, Mentor-on-the-Lake, Ohio, assignor to William H. Taylor, as trustee, and his successor, trustee Application September 2, 1937, Serial No. 162,155

1 Claim. (Cl. 123—188)

This invention relates to valves for internal combustion engines and to a method of making the same and constitutes an improvement on the valve set forth and more broadly claimed in United States Letters Patent No. 1,959,394, issued to me on May 23, 1934.

As set forth in my above-identified Letters Patent, the dissipation of heat from the valve stem is accomplished by maintaining contacting wall portions of the valve guide bore and the valve stem in yielding and resilient metal to metal contact, for example by slotting the stem longitudinally to enable it to press yieldingly upon the guide wall at several regions circumferentially of the stem. The valve stem fits the guide bore snugly, but not too tightly, so that during operation substantial portions of the guide wall and stem are in direct metal to metal contact, without clearance, and provide a direct metal to metal path for the conduction of heat from the stem into the guide. From the guide, the heat is dissipated into the engine block and water of the surrounding water jacket of the engine. Consequently, the valve does not become heated above a black temperature during operation even though the prior solid stem valves with their usual and necessary clearance in the guide and operating under the same conditions as the slotted valve, reach a temperature close to and often beyond the critical range of the metal and soon deteriorate.

In addition to this one broad principle of heat dissipation, several other fundamental changes in operation of a valve occur as a result (e. g.) of the slotting. As examples of these changes in operation, the slotted valve does not rock in the guide as do the usual solid stem valves, and as a result, the valve guide bore remains circular in cross section throughout the life of the engine. This, in turn, assures proper alignment and seating of the valve head on its seat. Further, due to the heat dissipation resulting (e. g.) from the slotting, the heretofore existing flow of heat from the valve stem into the tappet or valve lifter and seating spring and from there to other parts of the engine is reversed.

It is apparent, therefore, that since the mutual contact between the valve stem and the walls of the guide bore produce these effects, the greater the contact area provided and the more nearly perfect the fitting, the more pronounced will be these desirable advantages.

It has been found that when the valve stems are slotted with two intersecting slots extending through the axis of the valve stem, some internal stresses in the metal are relieved, whereupon the sections of the valve stem defined by the slots tend to bow outwardly about axes normal to the axis of the stem to a diameter greater than the diameter of the guide bore, thereby eliminating along an appreciable part of the length of the guide, the clearance space which ordinarily exists between the solid stem and the guide bore walls.

The solid valve stem and guide are and have always been manufactured with an allowance for radial clearance between the guide bore and stem with the result that the radius of curvature from the valve guide bore and of the stem are slightly different. Consequently, although the sections of the stem engage the guide bore wall upon relief of internal stress by slotting, they do not engage these walls uniformly over their full circumferential surface.

One of the principal objects of the present invention is to provide a valve and guide combination in which the sections of the valve stem resulting from the slotting operation have the same radius of curvature about the longitudinal axis of the stem as does the bore of the guide, and in which the circumferential surfaces of the stem sections are not bowed appreciably about an axis tranverse to the axis of the stem but are more nearly parallel to the stem axis throughout the entire length of the guide, and fit snugly against the guide bore walls throughout the entire contact length of the guide.

Another object is to provide a valve and guide combination in which the valve stem fits the guide bore without any clearance even when the valve and guide are unheated and in which contact between the stem and guide is substantially uniform at all contacting portions thereof.

A more specific object is to provide a valve stem and guide combination in which substantially all of that part of the valve stem within the guide is more nearly uniformly radially yieldable so that the entire complementary contacting surfaces of the valve stem and guide bore for the full length of the guide bore are in full radial yielding contact with each other.

Another specific object resides in the method of manufacturing valve stems for effecting the cooperation above described.

Another object is to provide a valve and guide combination for both intake and exhaust purposes in which radially yielding contact between the guide bore walls and stem is maintained.

Other objects and advantages will become apparent from the following specification, wherein reference is made to the drawing, in which.

Figure 1:
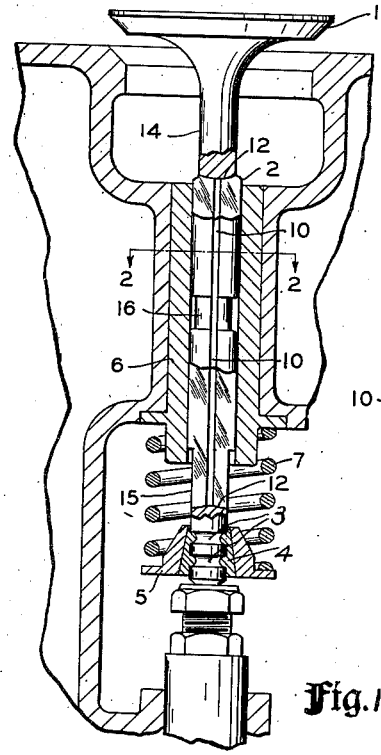
Fig. 1 is an enlarged side elevation of one form of valve embodying the principles of the present invention and installed in an internal combustion engine, parts of the engine and valve guide being shown in section for clearness in illustration.
Figure 2:
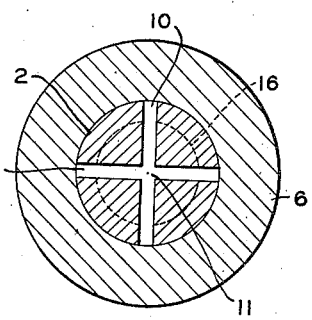
Fig. 2 is an enlarged cross-sectional view of the valve and guide, and is taken on a plane indicated by the line 2—2 in Fig. 1.
Figure 3:
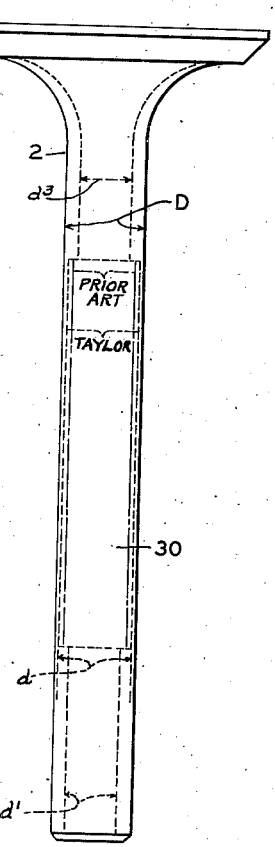
Fig. 3 is a side elevation of a valve blank illustrating one step in the manufacture of the present valve.
Figure 4:
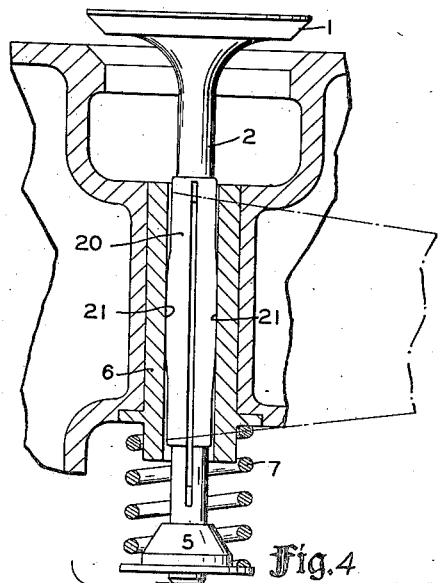
Fig. 4 is a diagrammatic side elevation of the valve showing, in exaggerated condition, the relation between the stem and guide in the prior art.

Referring to Figs. 1 to 3, the valve comprises a head 1 of a type suitable for the particular engine with which it is to be associated. For purposes of illustration, the usual internal combustion engine poppet valve is disclosed. The valve has a stem 2 which is preferably integral with the head and which, at the lower end, is provided with the usual annular grooves 3 which receive a split collar 4 to support a spring retainer 5. The valve is mounted in a longitudinal guide 6, and a compression spring 7 is interposed between suitable shoulders on the guide 6 and the spring retainer 5 for urging the valve to seated position. The valve stem is provided with a plurality of longitudinally extending slots 10, each of which preferably is disposed radially of the valve stem and lies in a plane through the axis of the stem. In the case of small diameter stems such as on a small pleasure automobile, three such slots are provided, the slots being arranged 120° apart, and in the case of larger stems, four or more slots are preferred, this number being increased as desired, depending upon the diameter of the particular stem with which they are to be associated. As better illustrated in Fig. 2, the intersection of the slots 10 provides a central axial space 11 which, in operative effect, is substantially an axial bore, and is comparable to the axial bore disclosed in my above identified Letters Patent. The slots thus divide the stem into a plurality of radially yieldable sections, the space 11 permitting the sections to yield radially without interference with each other.

The slots 10 are preferably finished at their upper ends with a very long radius so that the end wall 12 of the slot is as near normal to the stem axis as possible. This develops the resiliency afforded by slotting as near to the ends of the slots as possible.

As will be more fully described hereinafter, the valve stem 2 is made so as to fit the bore of the guide 6 without radial clearance before the stem is slotted. Consequently, the circumferential surfaces of the sections of the stem resulting from the slotting operation have exactly the same radius of curvature about the stem axis as the bore of the guide. As a result, the complementary contacting circumferential surfaces of the guide bore and stem sections are in full uniform contact throughout their entire circumferential extent. As recited, no clearance is provided and, consequently, the valve, when unheated, fits snugly into the guide usually with sufficient pressure, so that a weight of from five to ten pounds must be applied on the head of the valve to force the unheated valve stem into the guide bore. Upon subsequent heating, the slots partially close and relieve the pressure which would otherwise occur through expansion of the stem so that the snugness of fit is not appreciably changed. These slots automatically compensate for any further degree of expansion, maintaining the full contact with the guide at all times.

As explained above, it is also desirable that the circumferential walls of the stem sections be parallel to the axis of the stem and bore as distinguished from being bowed about a transverse axis. It has been found that upon slotting valves, which are originally of less diameter than the bore of the guide, for providing the usual operative clearance, the expansion of the valve stem upon relief of strain occasioned by the slotting operation results in stem sections which tend to bow outwardly near their longitudinal mid-portions, that is, about an axis normal to the axis of the valve stem. Necessarily, near the end of the slots there is less flexibility of the sections than near the longitudinal mid-portion thereof, and this apparently accounts for the bowing toward the mid-portions. Accordingly, at the lower end of the stem, the slots are extended an appreciable distance below the guide. In fact, they may extend a half inch, more or less, below the guide when the valve is in open position. As mentioned, the end wall 12 is such that the slots extend substantially to the upper end of the guide for their full depth when the valve is in open position. The valve stem 2 has an upper portion 14 which is preferably of reduced diameter and extends from beneath the head to very slightly below the upper end of the slots 10. The lower portion of the stem, indicated at 15, is of reduced diameter from slightly above the lower end of the guide to the lower end of the valve or beyond the lower end of the slots. Again, the longitudinal mid-portion of the stem may have a reduced diameter portion 16 so that two separate and well-defined bearing zones are provided, one from below the mid-portion of the stem upwardly to the top of the guide, and one from below the mid-portion of the stem to substantially the lower end of the guide when the valve is closed. The reduced stem portion 16 provides a point of change in flexure of the sections of the stem so that the upper portions and lower portions may accommodate themselves to a perfect alignment in the guide bore somewhat independently of each other.

The relations thus described may be better appreciated by comparison of Fig. 1 to Fig. 4 and Fig. 2 to Fig. 5. It will be noted that in Fig. 1 the entire length of the stem is in contact with the guide except at the longitudinal mid-portion 16 of the stem in those instances in which undercutting at 16 is provided. The reduction of the stem at the portion 16 is preferably used only in relatively large diameter stems. On the contrary, in Fig. 4, it will be seen that the stem 20 is bowed outwardly at its mid-portion 21 about an axis A transverse of the axis of the stem, so that the most effective contact is somewhat removed from the ends of the guide and tends to locate near the longitudinal mid-portion of the guide. Proper guiding and contact at the top and bottom of the contacting guide bore wall are important, however, for perfect alignment, and particularly at the top of the guide for heat dissipation. It has been found that a relatively limited area of proper, firm and intimate contact near the top of the guide will dissipate heat as rapidly as it enters the valve head so that the valve will not exceed black heat under operating conditions. Again it has been found that the expansion of the stem of the prior slotted valve occasioned by slotting and sometimes by mechanical spreading with a screw driver or other tool, after long use and repeated heating and cooling, tends to be reduced due to metal fatigue, and while maintaining contact, reduces the contact pressure and consequently the efficiency of guiding and of heat flow. By providing the stem of the same radius as the guide bore, however, this tendency is entirely eliminated and full contact pressure between the guide bore wall and the valve stem is maintained throughout the life of the valve and engine with which it is associated.

Figure 5:
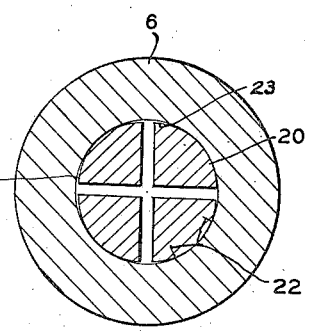
Fig. 5 is an enlarged cross sectional view of the valve and guide illustrated in Fig. 4.

Referring next to Figs. 2 and 5, it will be seen that in Fig. 2, the circumferential walls of the stem sections fit and conform to the circumferential wall of the guide bore, whereas in Fig. 5, the radius of curvature of the valve stem originally being different from the guide bore wall, the stem sections engage the bore wall only along relatively limited circumferential zones, such as indicated at 22, the marginal portions 23 of the sections, along the slots, tending to be spaced lightly from the walls of the guide bore. This necessarily reduces the contact area, and while not so pronounced as in Fig. 5, where the condition is exaggerated, it, nevertheless, exists and reduces the efficiency of the valve for the purposes intended.

Referring next to Fig. 3, the method of making the present valve is illustrated. As therein shown, the valve blank 30 has a stem which is greater in diameter D than the diameter $d$ of the guide bore with which it is to be associated, a certain allowance being made for grinding the same to fit the guide with the usual clearance being customary with the prior art valves. In the present instance, however, the stem is made sufficiently larger so that with the allowance for grinding, the valve stem may be of exactly the same diameter as the bore of the guide after the finish grinding. The lower end of the stem is then ground to a diameter $d_1$ slightly less than that of the guide bore, and the portion of the stem between the head and the upper end of the guide has also a diameter $d_3$ slightly less than the diameter $d$ of the guide. Thus the slots are formed from a stem originally having exactly the same radius of curvature about its longitudinal axis as the guide bore. Thereupon, the valve stem expands slightly and is of slightly greater diameter than the bore along the slotted portion of the stem. The stem is then forced into the guide bore, partially closing the slots to compensate for the differences of diameter, and thereafter any expansion of the stem due to heat is compensaed for by like action of the slots. Perfect guiding at the particular points at the upper and lower portions of the guide is assured. The end walls of the slots preferably lie in the reduced diameter portions of the ends of the stem and consequently the resiliency of the stem is developed for the full length of the guide. By allowing the additional metal in the stem, preparatory to slotting, more metal is provided for the conduction of heat than in my prior slotted valve.

With the structure described, it has been found that the usual hard steels and alloys, such as silicon and austenitic steels, are entirely unnecessary, as these steels have been used only because of the heat to which the usual solid valve stem is subjected, due to inadequate heat dissipation. The present invention dissipates the heat so rapidly that relatively soft steels may be used, the cause for which the hard steels were being provided being eliminated at their source. Further, the problem of proper alignment and elimination of rocking of the valve in the guide, which cannot be solved by the provision of more heat resistant alloys, is entirely satisfactorily solved, with the result that when the valves are installed, they operate properly for the life of the engine with which they are associated without subsequent grinding or adjustment.

Due to rapid heat dissipation, elongation of the valve is negligible and tappet or lifter clearance is not necessary. In case the present valve is to be used for an inlet valve due to its better alignment, the slots 10 and space 11 may be packed with asbestos and the like to prevent suction through the slots while permitting radial yielding of the stem sections.

Having thus described my invention, I claim:

In a valve and guide combination including a valve having a head and stem, a guide for the stem having a stem receiving bore of circular cross-section, the part of the stem received in the guide having its diameter equal to or greater than the diameter of the bore of the guide when the valve is in normal unheated condition, and means dividing the stem into radially yieldable sections, said stem fitting the guide with substantially uniform radially yielding pressure entirely to the ends of the guide when the valve is in unheated condition.

WILLIAM H. TAYLOR.